United States Patent [19]
Doenges et al.

[11] Patent Number: 6,021,966
[45] Date of Patent: Feb. 8, 2000

[54] PROCESS AND APPARATUS FOR SIMULTANEOUSLY GRINDING AND DRYING A MATERIAL TO BE GROUND CONTAINING MOIST CELLULOSE ETHER

[75] Inventors: Reinhard Doenges, Bad Soden; Manfred Sponheimer, Wiesbaden; Guenther Welt, Gau-Bischofsheim; Manfred Ziegelmayer, Bischofsheim, all of Germany

[73] Assignee: Clariant GmbH, Frankfurt, Germany

[21] Appl. No.: 09/309,152

[22] Filed: May 10, 1999

Related U.S. Application Data

[62] Division of application No. 08/946,419, Oct. 7, 1997.

[30] Foreign Application Priority Data

Oct. 10, 1996 [DE] Germany ............... 196 41 781

[51] Int. Cl.⁷ .................................................. B02C 13/00
[52] U.S. Cl. ................................ 241/57; 241/60; 241/62; 241/189.1
[58] Field of Search ...................... 241/18, 23, 57, 241/60, 62, 73, 74, 189.1

[56] References Cited

U.S. PATENT DOCUMENTS

| | | | |
|---|---|---|---|
| 4,526,678 | 7/1985 | Myhren et al. | 209/2 |
| 4,582,260 | 4/1986 | Folsberg | 241/19 |
| 4,824,031 | 4/1989 | Wiley | 241/39 |
| 4,885,067 | 12/1989 | Doty | 204/157.6 |
| 4,979,681 | 12/1990 | Donges et al. | 241/17 |
| 5,251,826 | 10/1993 | Schonbach et al. | 241/19 |

*Primary Examiner*—Joseph J. Hail, III
*Assistant Examiner*—William Hong
*Attorney, Agent, or Firm*—Philip P. McCann

[57] ABSTRACT

In the process and the apparatus, a gas stream is divided into three partial gas streams. The first partial gas stream transports the material to be ground into the grinding and friction space of a mill (26), while the second partial gas stream runs around the friction space in the mill. The third partial gas stream is connected to the output side of the mill and takes up the reduced and dried ground material, transported out of the mill by the first and second partial gas streams, in order to transport it to a separator (30).

13 Claims, 5 Drawing Sheets

PROCESS AND APPARATUS FOR SIMULTANEOUSLY GRINDING AND DRYING A MATERIAL TO BE GROUND CONTAINING MOIST CELLULOSE ETHER

This is a division of application Ser. No. 08/946,419, filed Oct. 7, 1997.

The invention relates to a process for simultaneously grinding and drying a material to be ground containing moist cellulose ether and also an apparatus for carrying out the process.

In principle, virtually all cellulose ethers have to be ground and dried to make them suitable for use. After reacting and after cleaning byproducts produced during the reaction, the cellulose ethers are in the form of a crumbly, lumpy, fibrous, wool-like or wadding-like structure. In this form, they are not suitable for use, for example in products which are soluble in organic and/or aqueous media. In general, it is necessary to set specific particle size distributions, degrees of drying and degrees of viscosity of the ethers for the different fields of use of cellulose ethers. Thus, for example, ethers in finely divided or very finely divided form are required to allow lump-free solutions to be quickly prepared in water. For ethers capable of swelling quickly, which are required in the oil drilling or construction industries for example, the viscosity distribution and/or particle size distribution of the products are of decisive significance for their effectiveness.

Thus, EP-B 0 370 447 discloses a process for simultaneously grinding and drying moist cellulose ethers in which a cellulose ether having an initial moisture of 20 to 70% by weight is introduced into a circular space by means of a transporting gas, is impact-reduced while being circulated and the product is simultaneously friction-reduced in the counterrunning direction with respect to the impact reduction, the circumferential speed of the counter-working reduction stages being regulated to such a value as to produce a grinding energy which dries the final product to a predetermined residual moisture of 1 to 10% by weight. In the case of this process, the ground material is transported further by the gas stream introduced into the reduction spaces, is then separated from the gas stream and, if appropriate, is subjected to selective screening. This single-stage process, in which grinding and drying are performed simultaneously, gives rise to the occurrence of oversize material, which exceeds a predetermined particle size or particle size distribution and is therefore returned to the feedstock with the aid of devices which are known per se. Before being returned into the circulation, the oversize material must be moistened again, in order to prevent hornification or viscosity reduction being caused by this product fraction.

DE-C 952 264 discloses a three-stage process for transferring moist, fibrous methyl celluloses into powder of a high dissolving rate. Here, the product, containing 50 to 70% by weight of water, is firstly homogenized to a pasty mass and cooled to 10 to 20° C., employing a cooled screw extruder; subsequently, it is ground in a caged hammer mill and dried in a circulating-air dryer.

U.S. Pat. No. 4,044,198 describes a process for preparing cellulose derivatives, preferably cellulose ethers, having a high proportion of fines. Here, the moist cellulose derivatives are embrittled by means of liquid nitrogen and then subjected to grinding.

U.S. Pat. No. 4,076,935 and the related U.S. Pat. No. 4,132,088 are directed to processes for finely grinding cellulose or its derivatives, in particular ether, the grinding of the product being performed with a water content of 5 to 14% by weight for as long as it takes until the particle size is at most 100 $\mu$m and the residual moisture is at most 2 to 10 percent by weight. Vibratory grinding mills are used for this purpose.

U.S. Pat. No. 4,415,124 describes a two-stage process for preparing micropowders from cellulose ethers or cellulose, the products, which have a fine-fibrous or wool-like structure, firstly being converted into an embrittled, solidified form and the material pretreated in this way being subjected to grinding until a particle size distribution of at least 90% below 125 $\mu$m is reached. Vibratory mills or ball mills, preferably of a cooled design, or pellet presses are used in the embrittling stage and pinned disk mills or impact disk mills are used in the grinding stage.

DE-A 14 54 824 describes a process for preparing granules or powders from fibrous, dry cellulose ethers by frictioning between two rolls at different rotational speeds and subsequent grinding.

DE-A 30 32 778 refers to a two-stage process for continuously homogenizing moist cellulose ethers, in that the moist cellulose ether is subjected to a cutting, beating and shearing action, produced by rotating rotary elements with various lateral surface profiles, if appropriate simultaneously pelletizing the reduced cellulose ethers with the addition of water and subsequently drying the pellets obtained.

The known processes according to the prior art are, for the most part, multi-stage processes with predrying or preembrittlement or precompaction or require high expenditure on apparatus, for example due to intensive cooling. Furthermore, in the case of all the processes, the chemical and/or thermal stressing of the macromolecules, in particular when processing high-viscosity, highly substituted products, is still so high that during the grinding the macromolecules are broken down in the sense of a chain reduction, which is manifested in particular by the greater or lesser reduction in viscosity in comparison with the products used. In addition, the surfaces of the products treated become horny due to the preembrittling or predrying steps, which is manifested undesirably with respect to the rapid and complete dissolving properties required by the customer.

The object of the invention is to develop further the process known from EP-B 0 370 447 such that, by optimal setting of the grinding and drying parameters, a greater range of degrees of grinding can be set, the apparent density of the ground material can be further increased and the proportion of oversize material can be considerably reduced, with no or only very slight reduction in viscosity of the reduced ground material in comparison with the original material to be ground. Furthermore, the invention is intended to have the effect of decreasing the energy to be introduced and of increasing the overall efficiency of the process.

This object is achieved according to the invention in that
a) a gas stream is divided into three partial gas streams,
b) a first partial gas stream, which transports the material to be ground, is introduced into the grinding and friction space of a mill for reducing the material to be ground,
c) a second partial gas stream is introduced tangentially into the space between the mill housing and the friction space,
d) a third partial gas stream takes up and transports further the reduced and dried ground material brought out of the mill by the first and second partial gas streams,
e) the ground material is separated from the three partial gas streams brought together to form a complete gas stream and f) the complete gas stream is filtered and, if appropriate, returned and reused.

In a refinement of the process, the first partial gas stream makes up 20 to 35% by volume, the second partial gas stream makes up 15 to 20% by volume and the third partial gas stream makes up 50 to 65% by volume of the gas stream.

The process is conducted in such a way that the initial moisture of the cellulose ether is 20 to 70% by weight and the final or residual moisture is 1 to 10% by weight.

The process is designed in such a way that the first partial gas stream introduces the material to be ground into the grinding space for impact reduction, the material to be ground being circulated, that the impact-ground material is simultaneously friction-ground in the friction space in the counterrunning direction with respect to the circulation and that the second partial gas stream flows around the outside of the friction space in the counterrunning direction and contributes to the temperature-controlling and/or moistening of the ground material to the desired residual moisture.

The further procedure followed in the process is specified by the features of claims 5 to 10.

The apparatus for carrying out the process is distinguished by the fact that a main gas line, connected to a gas-stream source, is connected via a heating and temperature-controlling register to an outlet line of a mill and to a separator, that a first gas line branches off from the main gas line and is connected to a metering line for the material to be ground and is connected to the mill on the input side and that a second gas line, which is likewise connected to the mill on the input side, branches off from the first gas line.

In a refinement of the apparatus, a reducing damper for regulating the gas pressure in the main gas line is arranged in the main gas line between the branch of the first gas line and the output of the mill. Similarly, a reducing damper in the second gas line regulates the gas pressure.

In a development of the apparatus, in the separator the reduced ground material can be separated from the complete gas stream and an outlet line for the complete gas stream out of the separator is connected to the gas-stream source and a return line is connected to a condenser and the gas stream is circulated.

The mill expediently has a beater wheel, equipped with a plurality of beater bars, and a screening cage which is arranged concentrically with respect to said beater wheel and surrounds it, the screening cage comprises sawtooth segments arranged sectionally next to one another at the circumference and friction plates fastened to supporting screens, the supporting screens being provided with holes, and the distance between the screening cage and the inside wall of a housing of the mill is 12 to 30 mm.

The invention achieves the advantage that the degree of grinding, the drying and the particle size of the ground material can be set very accurately to desired values by simple means, with which the complete gas stream is divided into three partial gas streams, it being possible to regulate the flow velocities and the quantities of the partial streams.

The invention is explained in more detail below with reference to the drawings, in which.

Figure 1:
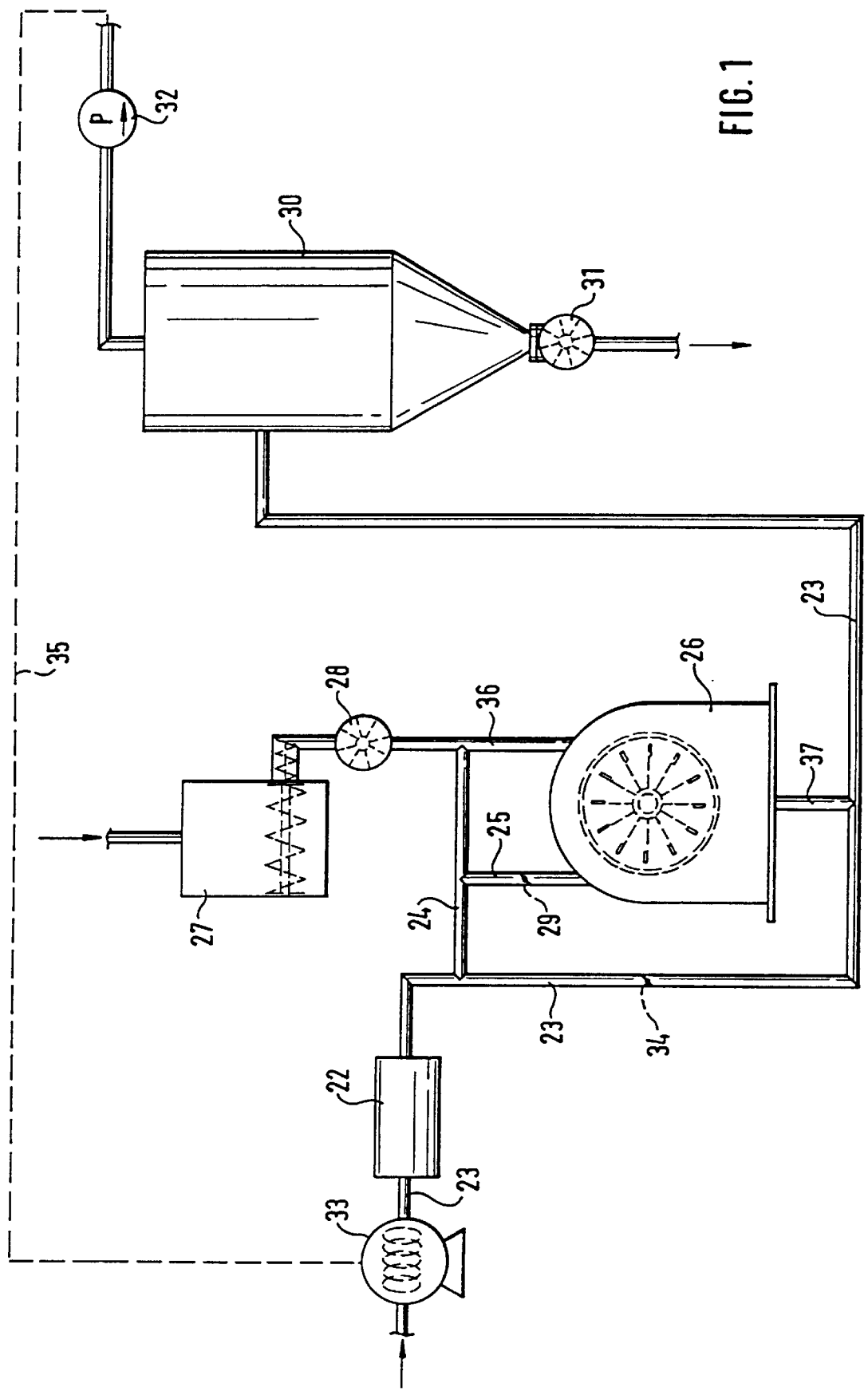
FIG. 1 shows a block diagram of the apparatus according to the invention.

As FIG. 1 shows, a gas-stream source 32, operated on the suction side, delivers via the heating register 22 a gas stream which, after the heating register, is divided into three partial gas streams. For this purpose, a first gas line 24 branches off from the main gas line 23 and is connected to a metering line 36 for the material to be ground. From the first gas line 24 there branches off, furthermore, a second gas line 25, which is connected to a mill 26, on the input side. The material to be ground is fed to a metering bunker 27 and passes via a speed-regulated screw conveyor into the metering line 36, in which a rotary feeder 28 is located. As already mentioned, the first gas line 24, for the first partial gas stream, is connected after the rotary feeder 28 to the metering line 36, in order to bring the material to be ground into the mill 26. The second gas line 25, for the second partial gas stream, is connected tangentially to the mill housing 1 and contains a reducing damper 29 for regulating the gas pressure of the second partial gas stream, which does not transport any material to be ground.

In the main gas line 23, which transports the third partial gas stream further, a reducing damper 34 for regulating the gas pressure in the main gas line 23 is arranged between the branch of the first gas line 24 and the output of the mill 26, which is connected via an outlet line 37 to the main gas line 23. The ground material, reduced and dried in the mill 26, is brought by the first and second partial gas streams, which were brought together in the mill 26, via the outlet line 37 into the main gas line 23, in which the three partial gas streams are brought together again and form a complete gas stream, which transports the dried and reduced ground material further in the main gas line 23 to a separator 30. In the separator 30, the reduced ground material is separated from the complete gas stream and discharged via a rotary feeder 31 at the output of the separator 30 for further use. The separator 30 has, furthermore, an outlet line for the complete gas stream, which is connected to the gas-stream source 32. A return line 35, depicted by a broken line in FIG. 1, connects the gas-stream source 32 to a condenser 33, in which the moisture introduced can be removed from the cleaned complete gas stream and the complete gas stream can be returned into the circulation again. Of course, it is also possible to dispense with a return, so that then the return line 35 and the condenser 33 could be omitted. In this case, the cleaned gas stream, which is generally an air stream, escapes into the atmosphere.

Figure 2:
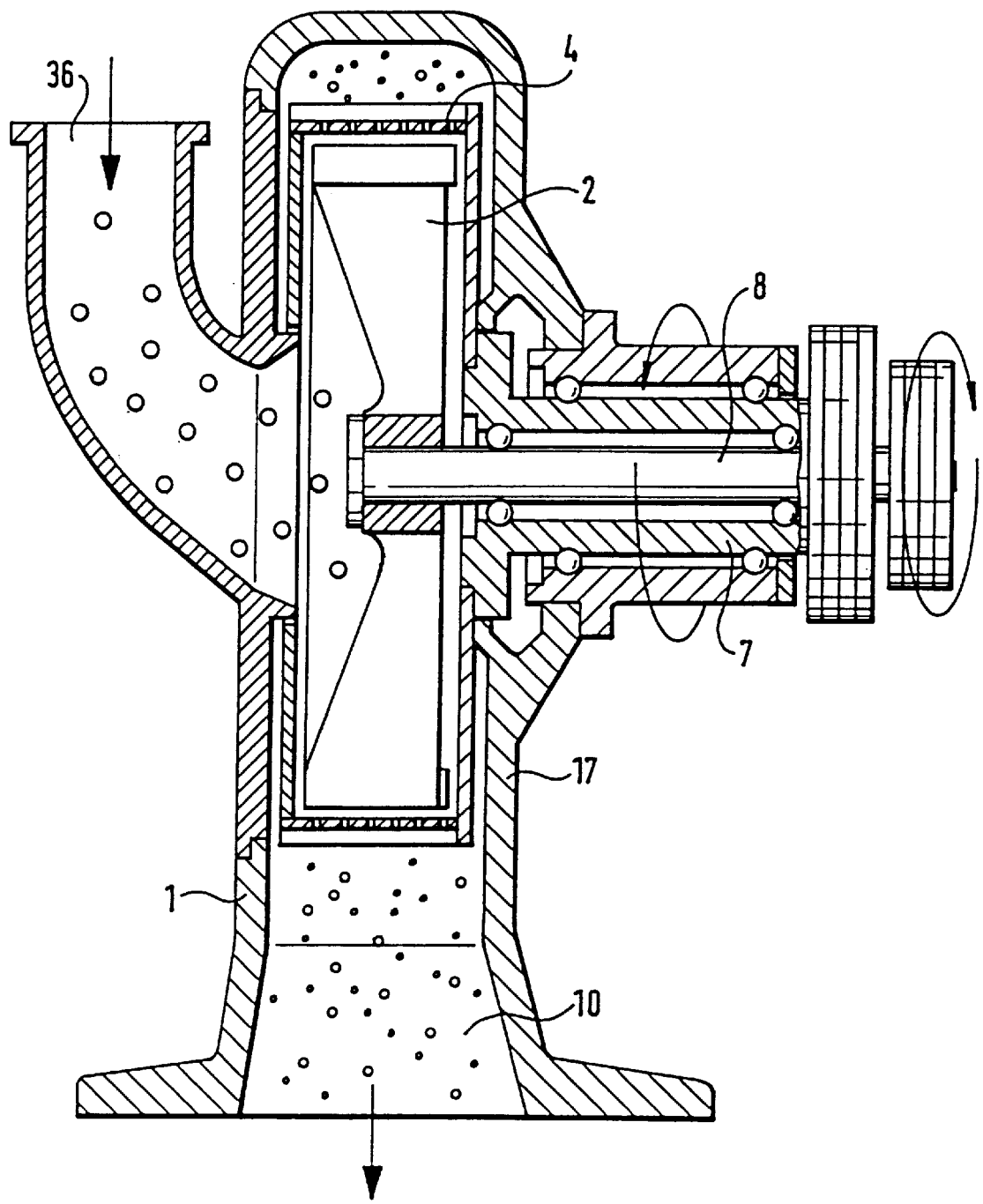
FIG. 2 shows a sectional side view of a mill, which is a component part of the apparatus, according to FIG. 1.

In the diagrammatical side view of the mill 26 in FIG. 2, the metering line 36 for the material to be ground is shown, which line is connected approximately centrally to the housing 1 at the level of drive shafts 7 and 8 for a screening cage 4 and a beater wheel 2, respectively. In this diagrammatical drawing, the material to be ground which is brought into the mill 26 is indicated by black circles in the metering line 36, and is introduced into the interior of the screening cage 4. The reduced ground material which has left the screening cage 4 is represented by black circles of smaller diameter than the material to be ground which is brought in. The reduced ground material is discharged through an outlet opening 10 located at the bottom of the mill 26. In the mill 26 there are devices 17 for controlling the temperature of the mill and of the screening cage 4. The direction of rotation of the beater wheel and screening cage is indicated by arrows.

Figure 3:
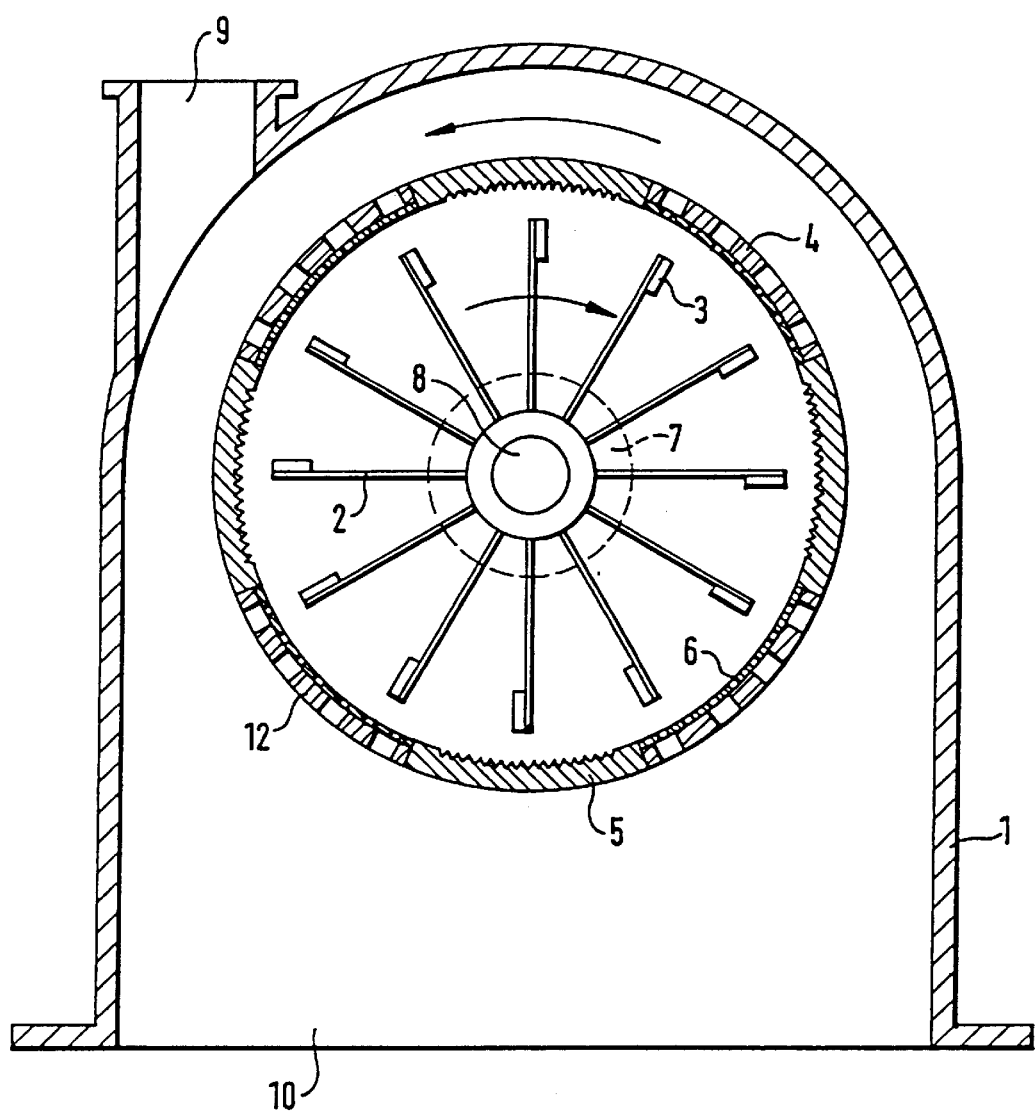
FIG. 3 shows a diagrammatical sectional view of the mill according to FIG. 2.

FIG. 3 shows in section in a diagrammatical representation, seen in side view, the mill 26 for impact-friction reduction of the material to be ground. Arranged in the housing 1 is a beater wheel, which rotates by means of the drive shaft 8 and has radial beating arms, at the end of which beater bars 3 are arranged. Arranged concentrically with respect to the beater wheel 2 is the screening cage 4, which is fastened on the drive shaft 7, which drives the screening cage in a counterrunning direction with respect to the beater wheel. The two drive shafts 7 and 8 are driven, for example, by a motor (not shown) via toothed belts. The screening cage is made up in sections from sawtooth segments 5 and friction plates 6, provided with openings. As already explained with respect to FIG. 2, the material to be ground and the first partial gas stream are brought into the screening cage 4 centrally via the metering line 36, while the second partial gas stream flows via the inlet opening 9 tangentially into the space between the inside wall of the housing 1 and the screening cage 4. The second partial gas stream does not transport any material to be ground up to the mill.

The material to be ground introduced into the screening cage 4 by the first partial gas stream is circulated and reduced by the beater bars 3 of the beater wheel 2. In counterrunning direction with respect to the circulation, the impact-reduced ground material is reduced further by the sawteeth of the sawtooth segments 5 and by the friction plates 6. The second partial gas stream flows around the screening cage 4 in counterrunning direction with respect to the rotational movement of the beater wheel 2 and contributes to controlling the temperature and/or moistening the ground material to the desired residual moisture, which is 1 to 10% by weight, and cleans the housing of adhering product particles. The initial moisture of the cellulose ether when it is brought into the mill 26 lies in the range from 20 to 70% by weight.

The three partial gas streams of the complete gas stream are divided such that the first partial gas stream makes up 20 to 35% by volume, the second partial gas stream makes up 15 to 20% by volume and the third partial gas stream makes up 50 to 65% by volume. Before being divided into the three partial gas streams, the gas stream is heated, or temperature-controlled, by the heating or temperature-controlling register 22 from a temperature of 14 to 25° C. to 60 to 200° C. and, as already mentioned before, the gas pressure of the second and third partial gas streams is regulated by means of the reducing dampers 29 and 34, respectively. The moisture content of the ground material can be regulated in addition to the temperature controlling of the three partial gas streams by means of the devices 17 in the mill 26 (cf. FIG. 2), in order to set the desired final or residual moisture of the reduced ground material. For this purpose, the devices 17 are arranged within the screening cage 4 and housing 1, but a solution in which parts of the screening cage 4, for example the sawtooth segments 5 or the friction plates 6 are directly heated or temperature-controlled is also conceivable. Similarly, it is conceivable to control the temperature or to heat parts of the beater wheel 2, such as for example the beater bars 3.

The apparatus is used with preference for grinding cellulose ethers from the group of methyl, hydroxyethyl, hydroxypropyl and carboxymethyl celluloses and their mixtures, but similarly other substances can be ground and simultaneously dried. The cellulose ethers which are ground and dried generally have a viscosity of 5000 to 500,000 mPas, measured in a 1.9% strength aqueous solution (measured by the Höpplen method).

Figure 4:
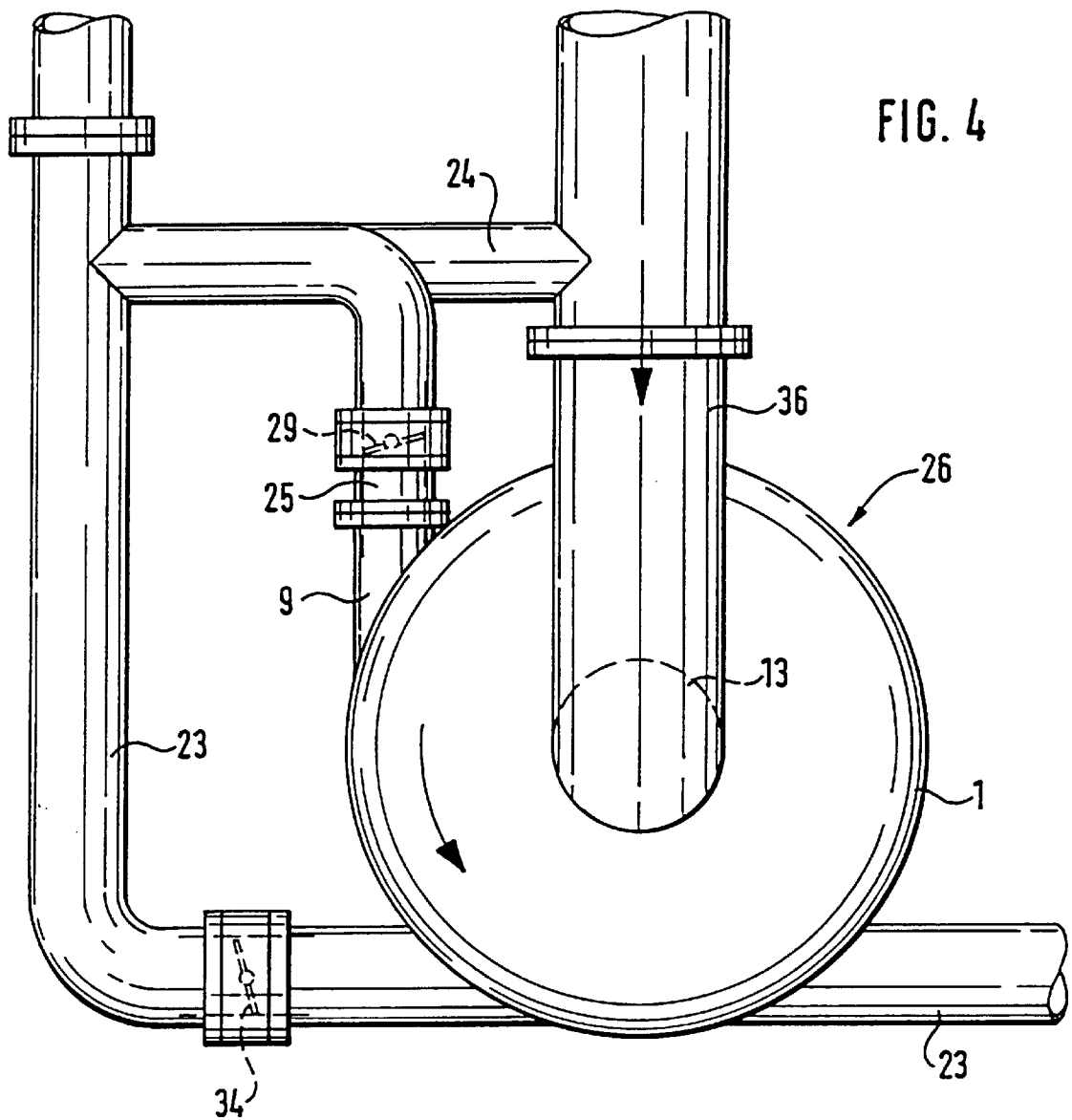
FIG. 4 shows a view of the mill and of line sections for the partial gas streams.

FIG. 4 shows in side view that the metering line 36 is connected to a side inlet opening 13 on the housing of the mill 26, the inlet opening 13 being located at the level of the drive shafts 7, 8 shown in FIG. 3, i.e. lying coaxially with respect to these drive shafts.

The second gas line 25 is connected to an upper inlet opening, or an inlet connection piece 9, on the housing 1, and the second partial gas stream flows through this second gas line 25 into the space between the inner side of the housing 1 and the screening cage 4. Via an outlet opening 10 provided in the bottom of the housing 1 (cf. FIGS. 2 and 3) and the outlet line 37 (cf. FIG. 1), the first partial gas stream, with the reduced and pulverized ground material, and the second partial gas stream flow into the main gas line 23, in which they are transported to the separator 30.

The beater wheel 2 rotates at a circumferential speed of 50 to 93 m/s and the counterrunning screening cage 4 rotates at a circumferential speed of 20 to 52 m/s.

Figure 5:
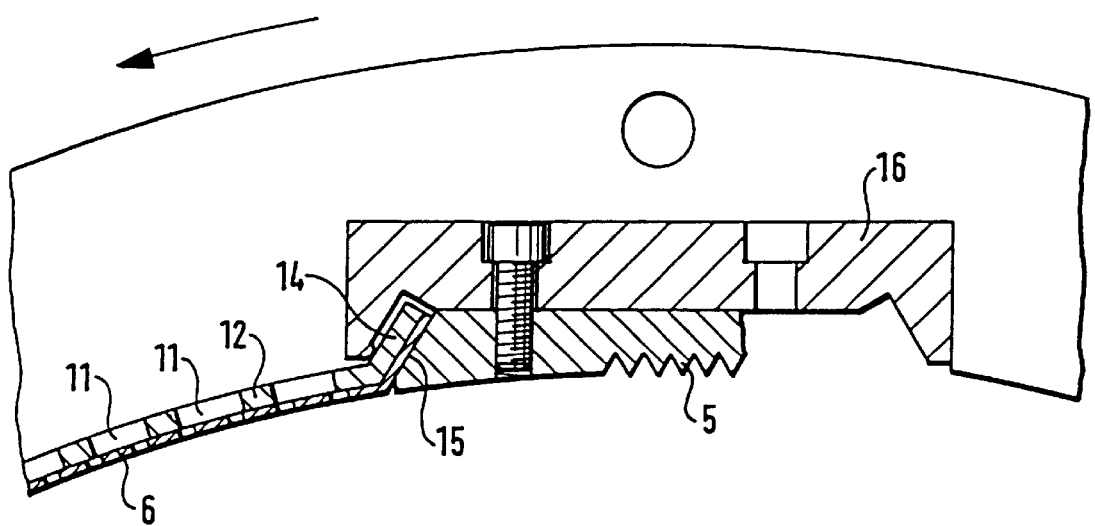
FIG. 5 shows a portion of a screening cage of the mill in section, seen in side view.

FIG. 5 shows a portion of this screening cage 4 on an enlarged scale. The screening cage 4 is made up of the circumferentially arranged sawtooth segments 5 and the friction plates 6 fastened to supporting screens 12, the sawteeth of the sawtooth segments 5 pointing into the interior of the screening cage, as do the friction plates 6. The supporting screens 12 are provided with holes 11. The friction plates 6 have a thickness of 0.75 to 2.0 mm and openings with a length of 0.12 to 0.8 mm and the same width as length. In the case of another embodiment of the friction plates 6, the width is 0.15 to 0.5 mm, while the length is 0.12 to 2 mm. The supporting screens 12 have outwardly angled-off ends 14, which bear against beveled faces 15 of the sawtooth segments 5. Clamping parts 16 enclose the ends 14 and the sawtooth segments 5 and are bolted to the latter. The length of the sawteeth is 1 to 10 mm.

The thickness of the supporting screens 12 lies in the range from 4 to 8 mm, and the holes 11 have a diameter of 15 to 20 mm. The lands between the holes have a minimum width of 4 to 5 mm.

The process and apparatus according to the invention permit quicker drying of the ground material and consequently an increased throughput of ground material through the apparatus, without a reduction in viscosity taking place, in comparison with the process and apparatus according to EP-B 0 370 447.

We claim:

1. An apparatus for carrying out a process for simultaneously grinding and drying a material to be ground containing moist cellulose ether, comprising a main gas line (23), connected to a gas-stream source (32), is connected via a heating and temperature-controlling register (22) to an outlet line (37) of a mill (26) and to a separator (30), wherein a first gas line (24) branches off from the main gas line and is connected to a metering line (36) for the material to be ground and is connected to the mill (26) on the input side and wherein a second gas line (25) branches off from the first gas line (24) and is connected to the mill (26) on the input side.

2. The apparatus as claimed in claim 1, wherein a reducing damper (34) for regulating a gas pressure in the main gas line (23) is arranged in the main gas line (23) between the branch of the first gas line (24) and the output of the mill (26).

3. The apparatus as claimed in claim 1, wherein a reducing damper (29) in the second gas line (25) regulates the gas pressure.

4. The apparatus as claimed in claim 1, wherein in the separator (30) the reduced ground material can be separated from the complete gas stream, wherein an outlet line for the complete gas stream out of the separator (30) is connected to the gas-stream source (32) and a return line (35) is connected to a condenser (33), and wherein the gas stream is circulated.

5. The apparatus as claimed in claim 1, wherein the mill (26) has a beater wheel (2), equipped with a plurality of beater bars (3), and a screening cage (4) which is arranged concentrically with respect to said beater wheel (2) and surrounds it, wherein the screening cage (4) comprises sawtooth segments (5) arranged sectionally next to one another at the circumference and friction plates (6) fastened to supporting screens (12), the supporting screens (12) being provided with holes (11), and wherein the distance between the screening cage (4) and the inside wall of a housing (1) of the mill (26) is 12 to 30 mm.

6. The apparatus as claimed in claim 5, wherein the metering line (36) is connected to a side inlet opening (13), arranged in the housing (1) coaxially with respect to drive shafts (7, 8) for the screening cage (4) and the beater wheel (2), for introducing the first partial gas stream, which transports the material to be ground, into the screening cage (4).

7. The apparatus as claimed in claim 5, wherein the second gas line (25) is connected to an upper inlet opening (9) in the housing (1), for introducing the second partial gas stream into the space between the inner side of the housing (1) and the screening cage (4).

8. The apparatus as claimed in claim 5, wherein the first partial gas stream, with the reduced ground material, and the second partial gas stream flow into the main gas line (23) via an outlet opening (10), provided in the bottom of the housing (1), and the outlet line (37).

9. The apparatus as claimed in claim 5, wherein the beater wheel (2) rotates at a circumferential speed of 50 to 93 m/s and the screening cage (4) rotates at a circumferential speed of 20 to 52 m/s.

10. The apparatus as claimed in claim 5, wherein the supporting screens (12) have obliquely outwardly angled-off ends (14), which bear against beveled faces (15) of the sawtooth segments (5) and wherein clamping parts (16) enclose the sawtooth segments (5), including the ends (14) of the supporting screens (12) bearing against them, and are bolted to the sawtooth segments (5), the sawteeth of which have a length of 1 to 10 mm.

11. The apparatus as claimed in claim 5, wherein the friction plates (6) have a thickness of 0.75 to 2.0 mm and openings with a length of 0.12 to 2.0 mm and the same width or with a width of 0.15 to 0.5 mm.

12. The apparatus as claimed in claim 5, wherein the supporting screens (12) have a thickness of 4 to 8 mm, the holes (11) have a diameter of 15 to 20 mm and the lands between the holes have a minimum width of 4 to 5 mm.

13. The apparatus as claimed in claim 5, wherein there are in the mill (26) devices (17) for controlling the temperature of the housing (1), of the beater wheel (2) or of the screening cage (4).

* * * * *